United States Patent
Surnilla et al.

(10) Patent No.: US 9,273,602 B2
(45) Date of Patent: Mar. 1, 2016

(54) INTAKE AIR OXYGEN COMPENSATION FOR EGR

(71) Applicant: Ford Global Technologies, LLC, Dearborn, MI (US)

(72) Inventors: Gopichandra Surnilla, West Bloomfield, MI (US); Lynn Aimee Chesney, Flat Rock, MI (US); Mark W. Peters, Wolverine Lake, MI (US); Timothy Joseph Clark, Livonia, MI (US); Matthew John Gerhart, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 241 days.

(21) Appl. No.: 13/789,182

(22) Filed: Mar. 7, 2013

(65) Prior Publication Data

US 2014/0251285 A1 Sep. 11, 2014

(51) Int. Cl.
| | |
|---|---|
| *F02B 47/08* | (2006.01) |
| *F02M 25/07* | (2006.01) |
| *F02M 25/08* | (2006.01) |
| *F02D 41/14* | (2006.01) |
| *F02D 41/00* | (2006.01) |

(52) U.S. Cl.
CPC .............. *F02B 47/08* (2013.01); *F02D 41/005* (2013.01); *F02D 41/0007* (2013.01); *F02D 41/0045* (2013.01); *F02D 41/144* (2013.01); *F02D 41/1454* (2013.01); *F02M 25/0709* (2013.01); *F02M 25/0711* (2013.01); *F02M 25/089* (2013.01); *F02D 2200/0406* (2013.01); *F02M 25/0749* (2013.01); *Y02T 10/121* (2013.01)

(58) Field of Classification Search
CPC ............ F02D 41/0042; F02D 41/0052; F02D 41/0072; F02D 41/144; F02D 41/1454; F02D 41/0045; F02D 41/005; F02D 41/0007; F02M 25/0711; F02M 25/0709; F02M 25/08; F02M 25/089; F02M 25/0836; F02M 35/10222; F02M 35/10209; F02M 35/10373
USPC .......... 123/516, 518, 519, 520, 559.1, 568.11, 123/568.15, 568.21, 704; 701/101, 102, 701/103, 108, 109
See application file for complete search history.

(56) References Cited

U.S. PATENT DOCUMENTS

| | | | | |
|---|---|---|---|---|
| 4,727,849 | A | * | 3/1988 | Nishida et al. ................. 123/704 |
| 5,977,525 | A | * | 11/1999 | Sahashi ......................... 219/494 |
| 6,371,086 | B1 | * | 4/2002 | Matsubara .......... F02D 41/0045 123/299 |
| 6,463,889 | B2 | * | 10/2002 | Reddy .................... F02M 33/02 123/3 |

(Continued)

OTHER PUBLICATIONS

Yamada, Shuya S., et al., "Turbocharger Waste Gate," U.S. Appl. No. 13/439,724, filed Apr. 4, 2012, 21 pages.

(Continued)

*Primary Examiner* — Lindsay Low
*Assistant Examiner* — Grant Moubry
(74) *Attorney, Agent, or Firm* — Julia Voutyras; Alleman Hall McCoy Russell & Tuttle LLP

(57) ABSTRACT

To compensate for possible corruption in exhaust gas recirculation control caused by fuel vapor purging, while still enabling the purging to continue, an engine intake oxygen concentration may be corrected based on a fuel canister vapor purge only during boosted conditions. Responsive to the intake oxygen concentration, exhaust gas recirculation may be adjusted.

17 Claims, 5 Drawing Sheets

(56) References Cited

U.S. PATENT DOCUMENTS

| | | | |
|---|---|---|---|
| 6,631,632 B2 * | 10/2003 | Matsubara et al. | 73/1.06 |
| 6,739,177 B2 * | 5/2004 | Sato et al. | 73/23.31 |
| 6,880,534 B2 * | 4/2005 | Yoshiki et al. | 123/520 |
| 6,951,199 B2 | 10/2005 | Suzuki | |
| 8,483,934 B2 * | 7/2013 | Cunningham | F02D 37/02 123/520 |
| 2005/0274369 A1 * | 12/2005 | Tonetti et al. | 123/704 |
| 2010/0313863 A1 * | 12/2010 | Yoshikawa et al. | 123/704 |
| 2011/0146631 A1 | 6/2011 | Konohara et al. | |
| 2013/0191008 A1 | 7/2012 | Surnilla et al. | |
| 2013/0131997 A1 * | 5/2013 | Inagaki | 702/24 |
| 2014/0150760 A1 * | 6/2014 | Surnilla et al. | 123/568.21 |

OTHER PUBLICATIONS

Surnilla, Gopichandra, et al., "Ejector Flow Rate Computation for Gas Constituent Sensor Compensation," U.S. Appl. No. 13/789,369, filed Mar. 7, 2013, 43 pages.

Pursifull, Ross Dykstra, "Methods and Systems for an Oxygen Sensor," U.S. Appl. No. 13/849,402, filed Mar. 22, 2013, 24 pages.

* cited by examiner

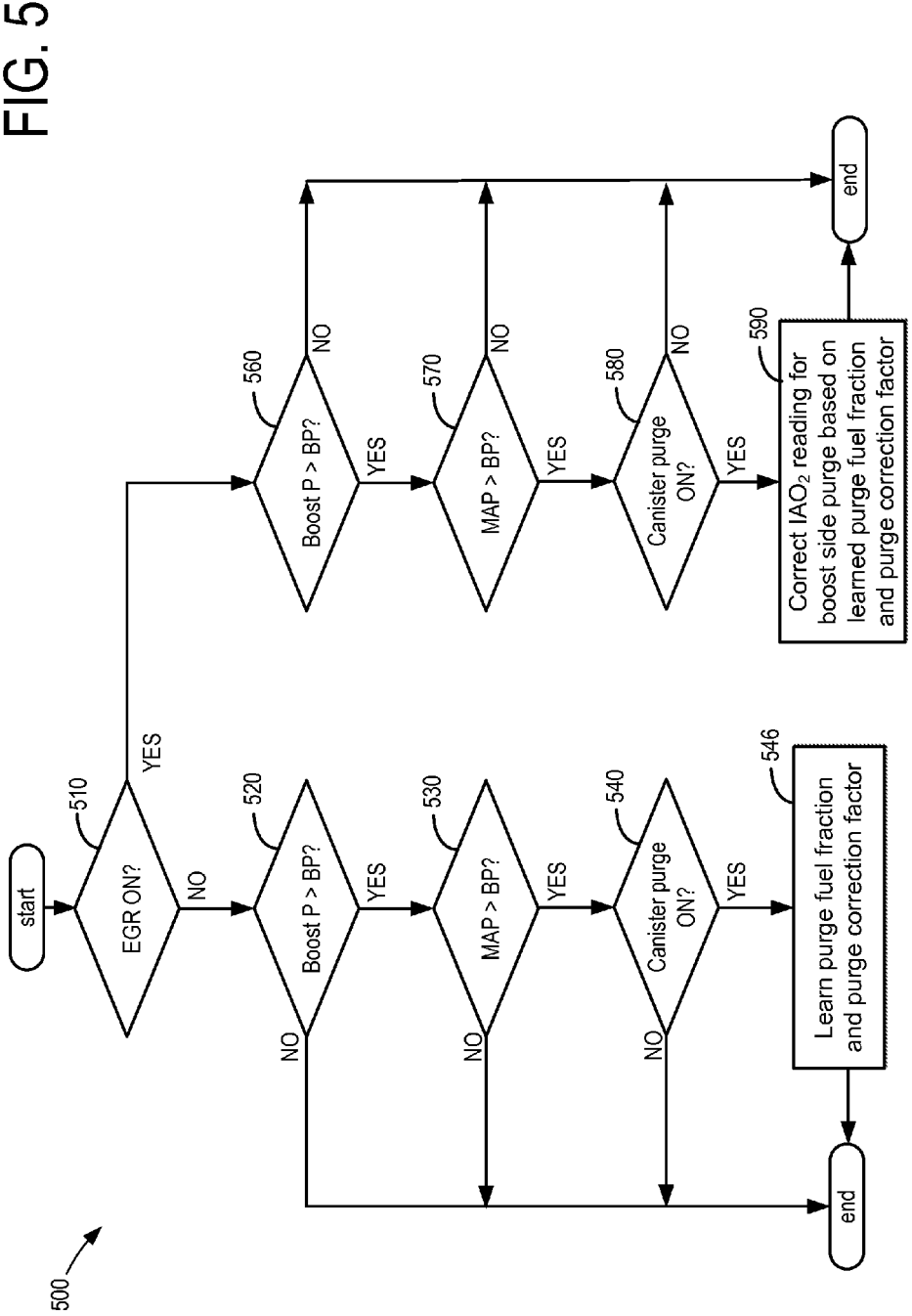

INTAKE AIR OXYGEN COMPENSATION FOR EGR

BACKGROUND AND SUMMARY

Engine systems may utilize recirculation of exhaust gas from an engine exhaust system to an engine intake system, a process referred to as exhaust gas recirculation (EGR), to reduce regulated emissions. For example, a turbocharged engine system may include a low-pressure (LP) EGR system which recirculates exhaust gas from the exhaust system to the intake passage upstream of a turbocharger compressor. An intake oxygen sensor may be located in the engine intake downstream from the compressor to provide an indication of EGR flow.

The inventors herein have recognized various issues with the above system. In particular, intake oxygen sensor (IAO2) measurements for determining exhaust gas recirculation (EGR) in low pressure EGR vehicle systems can be corrupted when purging fuel vapors to a boosted intake side of an engine. The purge fuel vapors can react on the surface of the oxygen sensor element and reduce the oxygen sensor element sensitivity. Accordingly, changes in oxygen concentration at the engine intake measured by the oxygen sensor are smaller than actual changes in oxygen concentration. The reduced change in oxygen concentration is interpreted by the engine control system as an erroneous larger than actual EGR. Engine operation with low EGR can lead to high engine temperatures, reduced fuel economy, increased NOx emissions, among other disadvantages.

To address the above issues, the inventors herein have identified that one example approach comprises measuring the oxygen concentration at the engine intake during a first condition when the EGR is off, boost pressure and manifold pressures are greater than the barometric pressure, and the canister purge is on. In this way, a purge fuel concentration can be estimated from the measured oxygen concentration. Furthermore, a purge correction factor can be determined from the estimated purge fuel concentration. During a second condition when the EGR is on, boost pressure and manifold pressures are greater than the barometric pressure, and the canister purge is on, the measured oxygen concentration can be corrected using the purge correction factor in order to determine the proper EGR. In this way, it is possible to compensate for possible corruption in EGR control caused by vapor purging, while still enabling the purging to continue.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 is an example flow chart for a method of correcting IAO2 measurements in the presence of purged fuel vapor.

DETAILED DESCRIPTION

Figure 1:
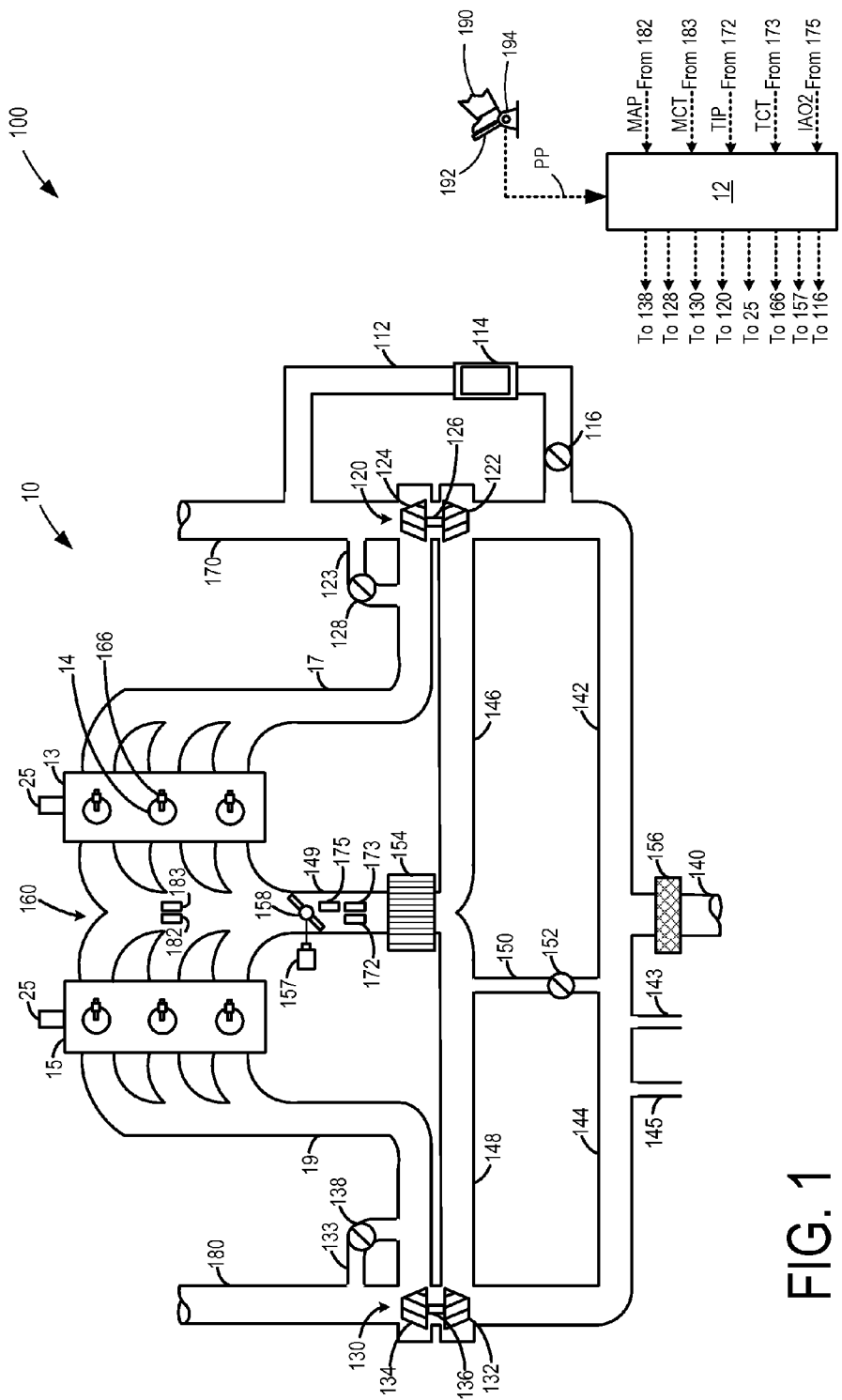
FIG. 1 is a schematic diagram of an example vehicle engine system.
Figure 3:
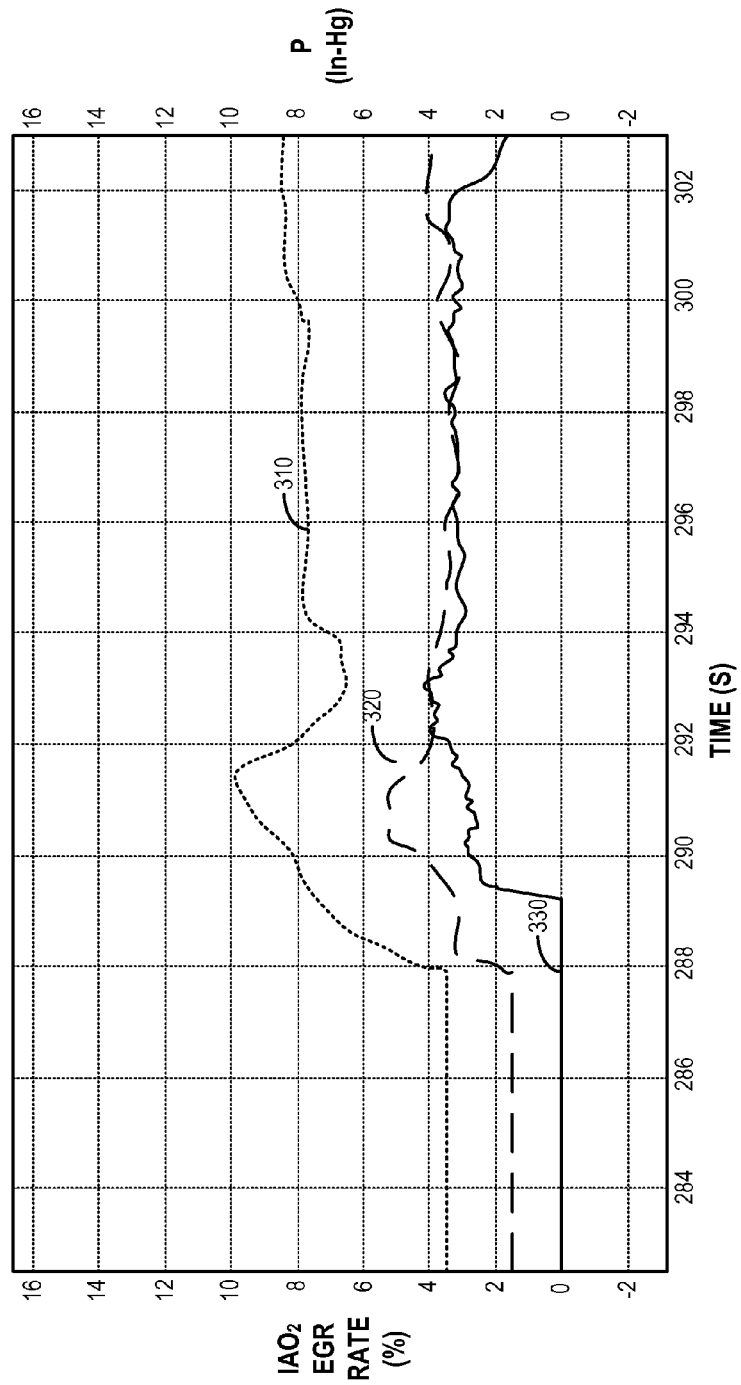
FIG. 3 is an example plot illustrating inferred EGR from an IAO2 sensor in the presence of purged fuel vapor.
Figure 4:
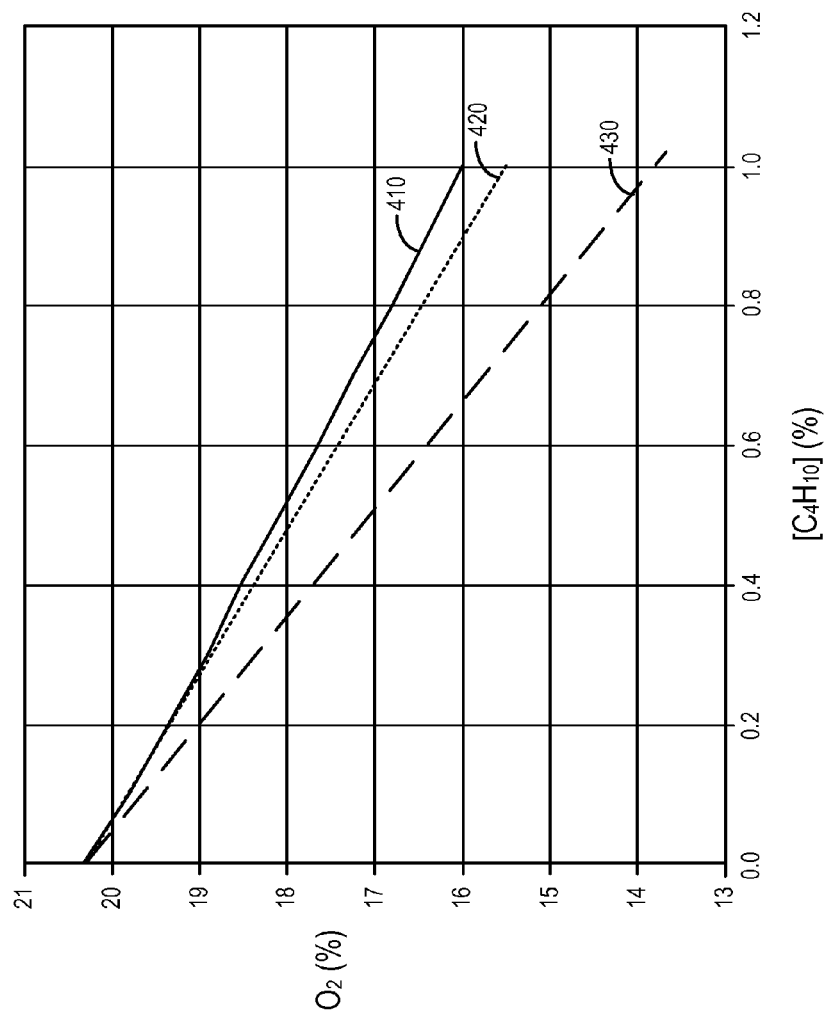
FIG. 4 is an example plot illustrating the impact of fuel vapor on the measured oxygen concentration.

The following description relates to methods and systems for correcting IAO2 sensor measurements at an engine intake in the presence of fuel vapor purge. The method can be applied to various boosted vehicle engine systems with purge such as a single bank low pressure EGR engine system as shown in FIG. 1, or a gas turbocharged direct injection (GTDI) dual path purge system shown in FIG. 2. FIG. 3 illustrates an example of how IAO2 measurements and inferred EGR may be corrupted by the presence of fuel vapor during purge conditions. FIG. 4 illustrates an example of a FMAN oxygen concentration response based on the presence of purged fuel vapor in the engine intake. An example method for determining a fuel concentration during a first condition when EGR is off, purge is on, and manifold absolute pressure (MAP) and boost pressure are greater than the barometric pressure (BP), and for determining a purge correction factor and corrected oxygen concentration during a second condition when EGR is on, purge is on, and manifold absolute pressure (MAP) and boost pressure are greater than the barometric pressure (BP) is shown in FIG. 5.

FIG. 1 shows a schematic depiction of an example engine system 100, for example a single bank low pressure EGR engine system, including a multi-cylinder internal combustion engine 10, twin turbochargers 120 and 130, and a single bank low pressure EGR 112. As one non-limiting example, engine system 100 can be included as part of a propulsion system for a passenger vehicle. Engine system 100 can receive intake air via intake passage 140. Intake passage 140 can include an air filter 156. At least a portion of the intake air can be directed to a compressor 122 of turbocharger 120 via a first branch of the intake passage 140 as indicated at 142 and at least a portion of the intake air can be directed to a compressor 132 of turbocharger 130 via a second branch of the intake passage 140 as indicated at 144.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold charge temperature (MCT), each communicating with controller 12. Intake passage 149 can include a charge air cooler 154 and/or a throttle 158. The position of the throttle can be adjusted by the control system via a throttle actuator 157 communicatively coupled to controller 12. As shown in FIG. 1, an anti-surge valve 152 may be provided to selectively bypass the compressor stages of turbochargers 120 and 130 via bypass passage 150. As one example, anti-surge valve 152 can open to enable flow through bypass passage 150 when the intake air pressure upstream of the compressors attains a threshold value.

Engine 10 may include a plurality of cylinders 14. In the depicted example, engine 10 includes six cylinders arranged in a V-configuration. Specifically, the six cylinders are arranged on two banks 13 and 15, with each bank including three cylinders. In alternate examples, engine 10 can include two or more cylinders such as 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 via common intake passage 149 may be used for fuel combustion and products of combustion may then be exhausted from via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

Products of combustion that are exhausted by engine 10 via exhaust passages 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via a solenoid valve. In this particular example, the solenoid valve may receive a pressure difference for facilitating the actuation of wastegate 128 via the actuator from the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve. In this particular example, the solenoid valve may receive a pressure difference for facilitating the actuation of wastegate 138 via the actuator from the difference in air pressures between intake passage 144 arranged upstream of compressor 132 and intake passage 149 arranged downstream of compressor 132. In other examples, other suitable approaches other than a solenoid valve may be used for actuating wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Products of combustion exhausted by the cylinders via exhaust passage 17 may be directed to the atmosphere via exhaust passage 170 while combustion products exhausted via exhaust passage 19 may be directed to the atmosphere via exhaust passage 180. Exhaust passages 170 and 180 may include one or more exhaust after-treatment devices, such as a catalyst, and one or more exhaust gas sensors.

A portion of the exhaust products in exhaust passage 170 may be directed to EGR 112, which recirculates the portion of the exhaust back to intake passage 142. EGR flow may be adjusted by controller 12 via EGR valve 116. For example, controller 12 may actuate EGR valve 116 to adjust EGR based in an oxygen concentration measurement by IAO2 sensor 175. As a further example, IAO2 sensor measurements can be used to infer EGR. In particular, when oxygen intake concentration is reduced, an increase in EGR may be inferred since the presence of EGR may dilute oxygen in the intake stream at the IAO2 sensor 175. Conversely, when oxygen intake concentration increases, a decrease in EGR may be inferred due to a reduction of EGR. Exhaust products may be cooled by EGR cooler 114 before entering intake passage 142 upstream of turbocharger compressor 122.

Engine 10 may also include a fuel vapor purge system (not shown), wherein fuel vapors from fuel stored in a fuel tank may be stored in a fuel vapor canister and purged from the canister through a canister purge valve to engine intake passage 144 via purge port 143. For example, under boost conditions, a portion of the boosted intake may be directed through an ejector which is configured to entrain purged vapors when the canister purge valve is opened. Further details of an example fuel system and fuel vapor purge system are described below with reference to another example of a vehicle engine system depicted in FIG. 2. Engine 10 may further include a positive crankcase ventilation (PCV) system port, where blow-by gases from the crankcase are recaptured and reintroduced to the engine intake via PCV port 145. In this manner, purged fuel vapor and blow-by gases may be combined with intake air and EGR in the engine intake manifold.

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 100 can include various other sensors. For example, each of intake passages 142 and 144 can include a mass air flow sensor (not shown). In some examples, one of intake passages 142 and 144 can include a mass air flow (MAF) sensor. In some examples, intake manifold 160 may include an intake manifold pressure (MAP) sensor 182 and/or an intake manifold temperature sensor 183, each communicating with controller 12. In some examples, common intake passage 149 may include a throttle inlet pressure (TIP) sensor 172 for estimating a throttle inlet pressure (TIP) and/or a throttle charge temperature sensor 173 for estimating a throttle charge temperature (TCT), and an intake oxygen (IAO2) sensor 175 for measuring intake oxygen concentration, each communicating with controller 12.

Engine 10 may receive control parameters from controller 12 and input from a vehicle operator 190 via an input device 192. In this example, input device 192 includes an accelerator pedal and a pedal position sensor 194 for generating a proportional pedal position signal PP. In response to the input received from the vehicle operator, controller 12 can be configured to adjust the amount of boost provided by turbochargers 120 and 130, and thereby adjust TIP. In one example, controller 12 may achieve this by varying the position of throttle 158 by adjusting throttle actuator 157. In another example, controller 12 may achieve this by adjusting wastegates 128 and 138, to thereby adjust an amount of exhaust that bypasses turbines 124 and 134. In other example, controller 12 may achieve this by adjusting the vane position and/or nozzle position of a variable geometry turbine.

Figure 2:
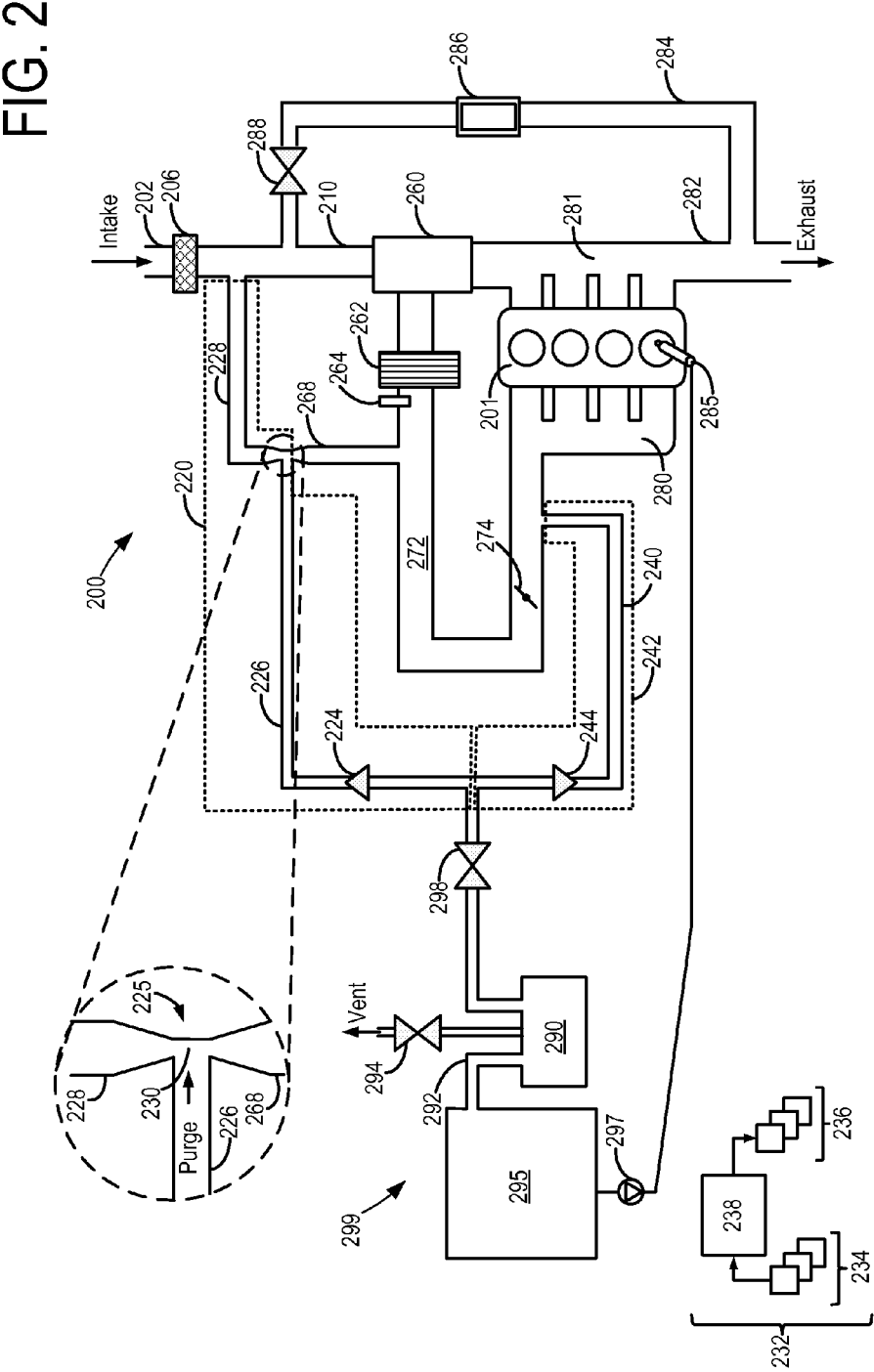
FIG. 2 is a schematic diagram of another example vehicle engine system, including a fuel vapor purge system.

FIG. 2 shows a schematic depiction of a vehicle engine system 200, for example a gasoline turbocharged direct injection dual path purge engine system. The vehicle engine system 200 includes an engine 201, an engine intake 202 and an engine exhaust passage 282. The engine intake 202 may include intake passage 210 upstream of a turbocharger compressor 260, and intake passage 272 downstream from turbocharger compressor 260 and upstream of throttle 274. Throttle 274 may be fluidly coupled to the engine intake manifold 280 via intake passage 272. An air filter 206 may be arranged at an upstream end of intake passage 210, to prevent abrasive particulate matter from entering the engine cylinders. The engine exhaust passage 282 includes an exhaust manifold 281 leading to an exhaust passage 282 that routes exhaust gas to the atmosphere. The engine exhaust passage 282 may include one or more emission control devices (not shown), which may be mounted in a close-coupled position in the exhaust passage 282. One or more emission control devices may include a three-way catalyst, lean NOx trap, diesel particulate filter, oxidation catalyst, etc. A portion of the engine exhaust may be recirculated to the engine intake passage 210 via a low pressure EGR 284. EGR flow may be regulated by EGR valve 288 and EGR may be cooled by EGR cooler 286 before reaching intake passage 210. It will be appreciated that other components may be included in the engine without departing from the scope of the invention.

The engine intake 202 further includes a boosting device, such as a compressor 260. Compressor 260 may be configured to draw in intake air at atmospheric air pressure and boost it to a higher pressure. As such, the boosting device may be a compressor of a turbocharger, where the boosted air is introduced pre-throttle. Using the boosted intake air, a boosted engine operation may be performed. A charge air cooler 262 may be arranged in intake passage 272 downstream of compressor 260, to cool the boosted air before it enters the engine in order to optimize available power for combustion.

Fuel system 299 may include a fuel tank 295 coupled to a fuel pump system 297 for pressurizing fuel delivered to the injectors of engine 201, such as the example fuel injector 285 shown. While a single fuel injector 285 is shown, additional fuel injectors are provided for each cylinder. It will be appreciated that fuel system 299 may be a return-less fuel system, a return fuel system, or various other types of fuel system. Vapors generated in fuel system 299 may be routed to a fuel vapor canister 290, described further below, via conduit 292, before being purged via a canister purge valve (CPV) 298 to the engine intake. Conduit 292 may optionally include a fuel tank isolation valve (not shown). Among other functions, fuel tank isolation valve may allow the fuel vapor canister 290 to be maintained at a low pressure or vacuum without increasing the fuel evaporation rate from the tank (which would otherwise occur if the fuel tank pressure were lowered). The fuel tank 295 may hold a plurality of fuel blends, including fuel with a range of alcohol concentrations, such as various gasoline-ethanol blends, including E10, E85, gasoline, etc., and combinations thereof.

Fuel vapor canister 290 may be filled with an appropriate adsorbent and configured to temporarily trap fuel vapors (including vaporized hydrocarbons) during fuel tank refilling operations and "running loss" (that is, fuel vaporized during vehicle operation). In one example, the adsorbent used is activated charcoal. Fuel vapor canister 290 may further include a canister vent valve 294 which may route gases out of the canister 290 to the atmosphere when storing, or trapping, fuel vapors from fuel system 299. Vent valve 294 may also allow fresh air to be drawn into fuel vapor canister 290 when purging stored fuel vapors from fuel system 299 via canister purge valve 298. While this example shows vent valve 294 communicating with fresh, unheated air, various modifications may also be used. Flow of air and vapors between fuel vapor canister 290 and the atmosphere may be regulated by the operation of a canister vent valve 294, which may include a solenoid valve.

Fuel vapor canister 290 operates to store vaporized hydrocarbons (HCs) from fuel system 299. Under some operating conditions, such as during refueling, fuel vapors present in the fuel tank may be displaced when liquid is added to the tank. The displaced air and/or fuel vapors may be routed from the fuel tank 295 to the fuel vapor canister 290, and then to the atmosphere through vent valve 294. In this way, an increased amount of vaporized HCs may be stored in fuel vapor canister 290.

During a later engine operation, the stored vapors may be released back into the engine intake via CPV 298. Under vacuum conditions at the intake manifold 280, when the CPV 298 is opened, fuel vapors are purged at a vacuum side 242, along a vacuum purge passage 240 to the engine intake downstream from the throttle 274. Accordingly, fuel vapor purged during vacuum conditions may not be detected by IAO2 sensor 264. Check valve 244 in the vacuum purge passage 240 ensures that purged vapors do not reverse flow away from engine intake manifold 280 in vacuum purge passage 240. The vacuum conditions may include intake manifold vacuum conditions. For example, intake manifold vacuum conditions may be present during an engine idle condition, with manifold pressure below barometric pressure.

Fresh air enters engine intake 202 at air filter 206. During boost conditions, compressor 260 pressurizes the air in intake passage 210, such that the pressure at intake manifold 280 may be greater than the barometric pressure. For example, the boost conditions may include one or more of a high engine load condition and a super-atmospheric intake condition, with boost pressure and intake manifold pressure greater than barometric pressure. During boost conditions, intake fluid (e.g., air, EGR, etc.) in intake passage 210 is compressed by turbocharger compressor 260. Pressure in intake passage 210 upstream of compressor 260 is lower than pressure in intake passage 272 downstream from compressor 260 during operation of compressor 260, and this pressure differential induces a portion of fluid from intake passage 272 to flow through passage 268 to ejector 225. This fluid may include a mixture of air, and fuel and/or EGR, for example. During boost conditions, purge fuel vapor may be purged at a boost side 220, along boost purge passage 226, through ejector 225 and along passage 228.

As shown in the magnified schematic of ejector 225 in FIG. 2, the compressed intake fluid flows through ejector 225 from passage 268 to passage 228. As the intake fluid flows into the ejector, it flows from the converging side to the diverging side of a nozzle 230. Because the diameter of the nozzle gradually decreases at the converging side and gradually increases at the diverging side thereof, a low pressure zone is created in a region of nozzle 230. The pressure in this low pressure zone may be lower than a pressure in boost purge passage 226. When present, this pressure differential induces flow of fuel vapors from the fuel vapor canister 290, when the CPV 298 is opened, and into ejector 225. Upon entering the ejector, the fuel vapors may be drawn along or entrained with the intake fluid entering the ejector from passage 268, exiting out of the ejector into passage 228. Operation of compressor 260 then draws the fluid and fuel vapors from passage 228 into intake passage 210 and through the compressor 260. After being compressed by compressor 260, the intake fluid and fuel vapors flow through charge air cooler 262, for delivery to intake manifold 280 via intake passage 272 and throttle 274. Check valve 224 in the boost purge passage 226 ensures that purged vapors do not reverse their flow direction away from the ejector 225 in the boost purge passage 226. In this manner, purged fuel vapors from CPV 298 are directed to the engine intake passage 210 through compressor 260 and to engine intake manifold 280.

Fuel vapor canister 290 may not be coupled directly to intake passage 210 or intake 202. Rather, the canister may be coupled to ejector 225 via CPV 298, boost purge passage 226, and ejector 225 may be coupled to intake passage 210 upstream of compressor 260 via passage 228. Further, fuel vapor canister 290 may be coupled (via CPV 298, vacuum purge passage 240) to intake passage 272 downstream of the throttle, and not upstream of the throttle. In this way, purge vapor flow from fuel vapor canister 290 may pass through ejector 225 before continuing on to the intake passage 210 via passage 228 or through vacuum purge passage 240 before continuing on to intake passage 272 downstream of throttle 274, depending on whether boost or vacuum conditions are present.

The vehicle engine system 200 may further include control system 232. Control system 232 may receive information from a plurality of sensors 234 and sending control signals to a plurality of actuators 236. Sensors 234 may include pressure, temperature, air/fuel ratio, and composition sensors, for example. Furthermore, intake air oxygen sensor 264 may be located downstream from the charge air cooler 262. Actuators 236 may include fuel injector 285, CPV 298, EGR valve 288 and throttle 274, for example. The control system 232 may include a controller 238. The controller 238 may receive input data from various sensors, process the input data, and trigger various actuators in response to the processed input data based on instruction or code programmed therein corresponding to one or more routines. For example, the controller may determine a duty cycle of the CPV 298 based on engine operating conditions, the duty cycle of the CPV determining the flow rate of purge vapor.

The vehicle engine systems shown in FIGS. 1 and 2 are example engine systems and other engine systems may also be used. For example an engine with a dual bank EGR may be used. Additionally, engine systems in hybrid vehicles may be used.

Turning now to FIG. 3, it illustrates an example plot of inferred EGR rate 330 from an IAO2 sensor, boost pressure 310, and MAP 320 during a condition when EGR is off during boost operation in a conventional vehicle engine system using a conventional method to calculate EGR. As described above in reference to the vehicle engine systems in FIGS. 1 and 2, fuel vapor is purged from the boost side 220 (e.g., boost purge passage 226) when the boost pressure is greater than the barometric pressure, and when MAP is greater than the barometric pressure. FIG. 3 shows the impact of boost side purge on IAO2 measurement and inferred EGR. At approximately 289 s, purging of fuel vapors is begun, for example, by opening the CPV. Although EGR is off, the presence of purge fuel from the boost side in the intake may corrupt measurements from an IAO2 sensor. In particular, the presence of purge fuel at the IAO2 sensor may reduce the IAO2 sensor sensitivity such that dilution of intake oxygen and EGR may be inferred, even when EGR is off. For example, as shown in FIG. 3, when purging is started, up to approximately 4% EGR may be inferred by the IAO2 sensor, due to the reduced sensor sensitivity to oxygen present. In other words, purge fuel vapor may cause the IAO2 sensor to measure a reduction in oxygen concentration such that an increase in EGR is inferred. Accordingly, the corruption of the IAO2 sensor by the presence of fuel vapor may be greater than the dilution of oxygen by the presence of the fuel vapor.

Turning now to FIG. 4, it illustrates a plot illustrating predicted FMAN oxygen concentration (FMAN $O_2$%) response to the presence of purge fuel vapor. Predicted FMAN $O_2$% may refer to the concentration of oxygen from the engine combusted gases and may be inferred by an oxygen sensor such as an IAO2 sensor in the engine intake. FMAN $O_2$% response to fuel vapor purging may be used to determine the fuel vapor concentration in the intake. Curve 430 illustrates the theoretical FMAN $O_2$% response during fuel vapor purging, for example with butane fuel vapor. Combustion of purged fuel vapors may consume oxygen, as represented by the following chemical reaction, equation (1):

$$2C_4H_{10} + 13O_2 \rightarrow 8CO_2 + 10H_2O \quad (1)$$

According to equation (1), the reaction stoichiometry of butane combustion indicates that 6.5 moles of oxygen are consumed for each mole of butane consumed. A butane to oxygen stoichiometry ratio, BOSR, may equal 6.5. Thus, in response to a 1 mol % increase in purged butane fuel vapors, the theoretical FMAN $O_2$% 430 may decrease by 6.5%, as shown by 430 due to combustion of the purged butane fuel vapors.

FIG. 4 also shows the inferred FMAN $O_2$% 410 from the IAO2 sensor measurements. Inferred FMAN $O_2$% 410 decreases in response to the presence of purge fuel vapor (e.g., butane), but does not match the theoretical FMAN $O_2$% response 430. The discrepancy between the inferred FMAN $O_2$% 410 and the theoretical FMAN $O_2$% 430 may be due to corruption of the IAO2 sensor by the presence of purge fuel vapor. For example, diffusion of purge fuel vapor (e.g., butane) molecules may compete with diffusion of oxygen molecules at the surface of an IAO2 sensor, thereby reducing the sensitivity of IAO2 sensor. Accordingly, a diffusion correction factor may be applied to the theoretical FMAN $O_2$% 430 as shown by 420. For example, the diffusivity of the purge fuel vapors (e.g. butane vapor) may be lower than the diffusivity of oxygen due to the higher molecular weight of the fuel (e.g. butane). Furthermore, the diffusivity ratio (e.g., diffusion rate ratio) of fuel vapor, for example butane fuel vapor, to oxygen may be represented by equation (2):

$$D_{ratio} = (MW_{oxygen}/MW_{butane}) \quad (2)$$

where $D_{ratio}$ is the diffusion rate ratio of butane fuel vapor to oxygen, $MW_{oxygen}$ is the molecular weight of oxygen (e.g., 32 g/mol) and $MW_{butane}$ is the molecular weight of butane fuel vapor (e.g., 58 g/mol). Thus, $D_{ratio}$ may be calculated to be 0.74. As shown in FIG. 4, curves 420 and 410 match closely for low concentrations of butane (e.g., purge fuel vapor). Thus by applying a correction based on the diffusion rate ratio of butane and oxygen to the theoretical FMAN O$_2$%, the measured FMAN O$_2$% may closely predict the theoretical FMAN O$_2$% when EGR is off.

In this way, IAO2 measurements may further be used to calculate or estimate a purge fuel vapor concentration at the intake when EGR is off. For example, using equations (1) and (2), the fuel vapor concentration may be calculated from the measured FMAN O$_2$% response:

$$\text{mass \% purge fuel} = \Delta(FMAN\ O_2\%)_{measured} / (D_{ratio} * BOSR) * MW_{C4}/MW_{air} \quad (3)$$

Here, $\Delta(FMAN\ O_2\%)_{measured}$ is the change in measured FMAN O$_2$% in response to purge fuel vapor, $D_{ratio}$ is the diffusion rate ratio of butane to oxygen, BOSR is the butane to oxygen combustion stoichiometry ratio determined from equation (1) above, and $MW_{C4}$ and $MW_{air}$ are the molecular weights of butane and air, respectively. Then, using equation (3), the mass fraction of purge fuel in the intake, $\text{massfrac}_{fuel}$, can be calculated by equation (4):

$$\text{massfrac}_{fuel} = (\text{mass \% purge fuel}) * AM/100 \quad (4)$$

Here, AM is the air mass flow to the engine, for example as measured by a MAF sensor.

Next, the calculated purge fuel concentration may be used to determine a purge correction factor for correcting the inferred EGR from the measured IAO2 oxygen concentration during boost side purging of fuel vapors. For example, a purge correction factor may be determined based on a ratio of inferred purge fuel fraction from the IAO2 sensor (e.g., equation (4)), and an estimated purge fuel fraction when there is no EGR flow. When EGR is on, the purge correction factor may then be used to correct the inferred EGR from the IAO2 concentration measurement.

Turning now to FIG. 5, it illustrates an example flow chart for a method 500 of correcting inferred EGR based on IAO2 measurements during boost side purge fuel vapor. Method 500 may be executed at a controller of a vehicle engine system, for example. Method 500 begins at 510 where it is determined if EGR is on. When EGR is on, the EGR valve may be partially open and a portion of the exhaust gases may be recirculated to the engine intake. For example, control system 232 may determine that EGR valve 288 is partially open, indicating that EGR is on. When EGR is off, the EGR valve may be closed and no portion of the exhaust gases is recirculated to the engine intake. If EGR is off, then method 500 continues at 520 and 530 where it is determined if boost pressure and the manifold absolute pressure respectively are greater than barometric pressure (BP). For example, if the engine is operating under vacuum conditions, then the turbocharger compressor may not be on and neither the boost pressure nor the manifold absolute pressure may be greater than the barometric pressure. If either the boost pressure or the manifold absolute pressure is less than the barometric pressure, then method 500 ends.

If both the boost pressure and MAP are greater than BP, method 500 continues at 540 where it is determined if the canister purge is on. When the canister purge is on, the canister purge valve may be open, allowing fuel vapors to be purged from the fuel canister to the engine intake. For example, control system 232 may determine that canister purge valve 298 may be open, indicating that the canister purge is on. If the canister purge valve is closed, there is no purge flow of canister fuel vapors and the canister purge is off. If the canister purge off, for example if the canister load is low, then method 500 ends. If the canister purge is on, method 500 continues at 546, where a purge fuel fraction and a purge correction factor are determined. For example, a fuel combustion stoichiometry and a diffusion rate ratio of the fuel vapor to oxygen may be used as described above with reference to FIG. 4 to calculate a purge fuel vapor fraction, from which a purge correction factor may be determined. After 546, method 500 ends.

Accordingly, during a first condition, where EGR is off, boost pressure and MAP are greater than BP, and canister purge is on, method 500 determines the purge fuel fraction and the purge correction factor.

Returning to 510, if EGR is on, method 500 continues from 510 to 560 and 570 where it is determined if boost pressure and the manifold absolute pressure respectively are greater than barometric pressure (BP). For example, if the engine is operating under vacuum conditions, then the turbocharger compressor may not be on and neither the boost pressure nor the manifold absolute pressure may be greater than the barometric pressure. If either the boost pressure or the manifold absolute pressure is less than the barometric pressure, then method 500 ends. If both the boost pressure and MAP are greater than BP, method 500 continues at 580 where it is determined if the canister purge is on. If the canister purge off, for example if the canister load is low, then method 500 ends. If the canister purge is on, method 500 continues at 590.

At 590, the IAO2 measurements are corrected for boost side purge based on the learned purge fuel fraction and the purge correction factor determined at 546. For example, the inferred EGR from the IAO2 measurement may be multiplied by the purge correction factor to correct the inferred EGR based on the boost side purge flow.

Accordingly, during a second condition, where EGR is on, boost pressure and MAP are greater than BP, and canister purge is on, method 500 can correct the IAO2 sensor inferred EGR during purge conditions.

It will be appreciated that method 500 is provided by way of example, and thus, is not meant to be limiting. Therefore, it is to be understood that method 500 may include additional and/or alternative steps than those illustrated in FIG. 5, without departing from the scope of this disclosure. Further, it will be appreciated that method 500 is not limited to the order illustrated; rather, one or more steps may be rearranged or omitted without departing from the scope of this disclosure. For example, method 500 may perform 560 through 590 after learning a purge correction factor at 520 through 546.

In this manner, a method may comprise correcting an intake oxygen concentration based on fuel canister vapor purge only during boosted conditions, and adjusting exhaust gas recirculation responsive to the intake oxygen concentration. Measuring the intake oxygen concentration may be performed with an intake oxygen sensor located downstream from an intake compressor, and correcting the intake oxygen concentration only during boosted conditions may comprise correcting the intake oxygen concentration when a boost pressure is greater than a barometric pressure and a manifold absolute pressure is greater than the barometric pressure. Furthermore, correcting the intake oxygen concentration may be performed using a purge correction factor, wherein the purge correction factor may be based on the fuel canister vapor purge when the exhaust gas recirculation is off. Fuel canister vapor purge may be estimated from a change in the intake oxygen concentration.

As another example, a method may comprise adjusting exhaust gas recirculation responsive to a corrected intake oxygen concentration, the corrected intake oxygen concentration based on exhaust gas recirculation off conditions. The method may further comprise correcting an intake oxygen concentration only during boost conditions, wherein measuring the intake oxygen concentration is performed with an intake oxygen sensor located downstream from an intake compressor. Correcting the intake oxygen concentration may comprise correcting the intake oxygen concentration by a first amount when fuel vapor is purged along a first path upstream of the intake oxygen sensor, and correcting the intake oxygen concentration by a second amount when fuel vapor is purged along a second path downstream of the intake oxygen sensor. Further still, the first path may comprise a boosted path, and the second path may comprise a vacuum path.

In yet another example, a method may comprise during a first condition when exhaust gas recirculation is on, and canister purge is on, correcting an intake oxygen concentration based on a purge fuel concentration. During a second condition when exhaust gas recirculation is off, and canister purge is on, the method may further comprise estimating a purge fuel concentration based on an intake oxygen concentration. The first condition may further comprise a boost pressure greater than a barometric pressure and a manifold absolute pressure greater than the barometric pressure, and the second condition may further comprise a boost pressure greater than a barometric pressure and a manifold absolute pressure greater than the barometric pressure. Further still, correcting the intake oxygen concentration may comprise correcting the intake oxygen concentration measured by an intake oxygen sensor located downstream from an intake compressor.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the example routines may graphically represent code to be programmed into the computer readable storage medium in the controller.

The various ducts and passages referred to herein can encompass various forms of conduits, passages, connections, etc., and are not limited to any specific cross-sectional geometry, material, length, etc.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention clamied is:

1. A method, comprising:
    measuring intake oxygen concentration with an intake oxygen sensor located in an intake between a compressor outlet and a throttle inlet; and
    during boosted conditions only,
        correcting the measured intake oxygen concentration based on a fuel canister vapor purge into the intake upstream of the compressor; and
        adjusting recirculation of exhaust gas into the intake passage upstream of the compressor responsive to the corrected intake oxygen concentration.

2. The method of claim 1, wherein correcting the measured intake oxygen concentration only during boosted conditions comprises correcting the measured intake oxygen concentration when a boost pressure is greater than a barometric pressure and a manifold absolute pressure is greater than the barometric pressure.

3. The method of claim 2, wherein correcting the measured intake oxygen concentration is performed using a purge correction factor.

4. The method of claim 3, further comprising determining the purge correction factor based on the fuel canister vapor purge when the exhaust gas recirculation is off.

5. The method of claim 4, further comprising estimating the fuel canister vapor purge from a change in the measured intake oxygen concentration.

6. The method of claim 1 wherein measuring intake oxygen concentration comprises measuring the intake oxygen concentration with the intake oxygen sensor during boosted and unboosted conditions.

7. A method, comprising:
    measuring intake oxygen concentration with an intake oxygen sensor located in an intake between a compressor outlet and a throttle inlet;
    determining a purge correction factor based on the measured intake oxygen concentration only while low-pressure exhaust gas recirculation is off and fuel vapor canister purging into an engine intake is on;
    correcting the measured intake oxygen concentration based on the purge correction factor; and
    adjusting the exhaust gas recirculation responsive to the corrected intake oxygen concentration.

8. The method of claim 7, further comprising determining the purge correction factor and correcting the intake oxygen concentration only during boost conditions.

9. The method of claim 7, wherein correcting the measured intake oxygen concentration comprises:
    correcting the measured intake oxygen concentration by a first amount when fuel vapor is purged along a first path upstream of the intake oxygen sensor; and
    correcting the measured intake oxygen concentration by a second amount when fuel vapor is purged along a second path downstream of the intake oxygen sensor.

10. The method of claim 9, wherein the fuel vapor purged along the first path passes through an ejector before continuing on to the intake upstream of the intake oxygen sensor and the compressor.

11. The method of claim 9, wherein the fuel vapor purged along the second path enters the intake downstream of a throttle outlet.

12. The method of claim 9, wherein the first path comprises a boosted path.

13. The method of claim 12, wherein the second path comprises a vacuum path.

14. A method comprising,
    measuring intake oxygen concentration with an intake oxygen sensor located in an intake between a compressor outlet and a throttle inlet;
    only during a first condition when exhaust gas recirculation is off, and canister purge is on, estimating a purge fuel concentration based on the measured intake oxygen concentration; and then
    during a second condition when exhaust gas recirculation is on, and canister purge is on, correcting the measured intake oxygen concentration based on the estimated purge fuel concentration.

15. The method of claim 14, wherein the first condition further comprises a boost pressure greater than a barometric pressure and a manifold absolute pressure greater than the barometric pressure.

16. The method of claim 14, wherein the second condition further comprises a boost pressure greater than a barometric pressure and a manifold absolute pressure greater than the barometric pressure.

17. The method of claim 14, wherein correcting the measured intake oxygen concentration based on the estimated purge fuel concentration during the second condition comprises determining a purge correction factor from the estimated purge fuel concentration, and correcting the measured intake oxygen concentration using the purge correction factor.

* * * * *